Feb. 5, 1952     M. E. FOGLE     2,584,440
EXPOSURE METER

Filed May 9, 1946     3 Sheets-Sheet 1

Inventor
Martin E. Fogle

Feb. 5, 1952     M. E. FOGLE     2,584,440
EXPOSURE METER

Filed May 9, 1946     3 Sheets—Sheet 2

Inventor
Morlin E. Fogle

Feb. 5, 1952 — M. E. FOGLE — 2,584,440

EXPOSURE METER

Filed May 9, 1946 — 3 Sheets-Sheet 3

Inventor
Marlin E. Fogle

Patented Feb. 5, 1952

2,584,440

UNITED STATES PATENT OFFICE 2,584,440

EXPOSURE METER

Marlin E. Fogle, West Orange, N. J.

Application May 9, 1946, Serial No. 668,443

5 Claims. (Cl. 88—23)

This invention relates to photoelectric exposure meters of the type comprising a photocell, a sensitive, electrical measuring instrument actuated by such photocell, and a baffle movable into and out of operative position with respect to the photocell, and more particularly to novel means for automatically correlating the calculator scales of such an exposure meter in accordance with the condition under which the meter is being used, namely with baffle "on" or baffle "off."

Exposure meters of this general class are well known in the art. The photocell converts light rays into electricity which actuates the moveable coil of an electrical micro-ammeter to provide an indication or measure of the intensity of the light rays striking the surface of the photocell. A calculator device usually forms a part of the meter and provides a means for translating the light intensity reading into appropriate exposure factors such as "f" stop opening and camera shutter speed.

When using an exposure meter to measure the brightness of a scene to be photographed by reflected light, the cone of light rays striking the photocell should be limited in magnitude and preferably should be approximately equal to the image angle of the camera lens. This is accomplished by interposing a mechanical or optical baffle (or hood) in front of the photocell thereby establishing a definite view angle for the photocell. As the current output of a photocell is very small it is not possible to restrict the view angle of the photocell to a small value and yet obtain a significant indication of the instrument pointer under conditions wherein the light reflected from the scene is of a low order of intensity. To overcome this objection multi-range exposure meters have been provided having a plurality of baffles arranged so that the user may employ the baffle best suited to the particular light intensity condition. Thus, if the light reflected from the scene to be photographed is low a baffle having a wide angle of view is employed. However, it is apparent that use of baffles having different angles of view requires the introduction of an appropriate correction factor so that the meter will indicate identical settings of shutter speed and diaphragm opening for a scene of given brightness value regardless of the particular baffle employed. The application of the appropriate correction factor should be accomplished automatically to eliminate any possibility of mistake or error on the part of the user.

One type of exposure meter accomplishes the above purpose by providing two light intensity scale ranges on the scale plate of the instrument, the scale plate being movably connected to the mechanical baffles in such manner that only one light intensity scale range is visible at any one time. Thus, when the user elects to use the wide angle baffle over the photocell the scale range of relatively low brightness values is visible. On the other hand, when the light intensity is sufficiently high to permit use of the narrow angle baffle, insertion of the baffle into position automatically shifts the scale plate so that only the scale range of relatively high brightness values is visible. While this type of meter has met with considerable success it is open to the objection that the calculator forms a separate unit of the complete device and the user is required not only to transfer mentally the particular brightness reading of the instrument to the corresponding indicia on one of the calculator dials, but also to correlate said transferred reading with a separate calculator dial bearing two scales of ranges of another exposure factor and to select therefrom the proper scale of range depending upon whether the instrument is being operated with wide angle or narrow angle baffle.

One embodiment of my invention overcomes the above objection by providing a multi-range exposure meter having a single light intensity scale range but including a mechanism for automatically shifting one of the elements of the calculator to provide a proper correlation of exposure factors in accordance with the view angle of the particular baffle positioned over the photocell.

An object of this invention is the provision of an exposure meter including a range-changing member or movable baffle, a calculator and a mechanism associated with the range-changing member and the calculator whereby the various exposure factors are automatically and correctly correlated for all light intensity ranges of the meter.

An object of this invention is the provision of a multi-range exposure meter of the type wherein the light intensity scale plate of the instrument forms part of the calculator and including a mechanism for displacing one of the elements of the calculator with respect to other elements of the calculator depending upon the view angle set for the measurement of the brightness of the particular scene.

An object of this invention is the provision of an exposure meter having a movable baffle for the photoelectric cell, and a mechanism operative with or by the baffle to impart a predetermined compensatory movement to one of the calculator members to reestablish the correlation between two elements of the calculator whereby identical exposure factors are indicated regardless of whether the baffle is in the operative or inoperative position.

The manner of accomplishing these objects, as well as other objects and advantages, will be more apparent from the following description when taken with the accompanying drawings.

In the drawing wherein like numerals identify like parts in the several views.

Figures 1, 2:
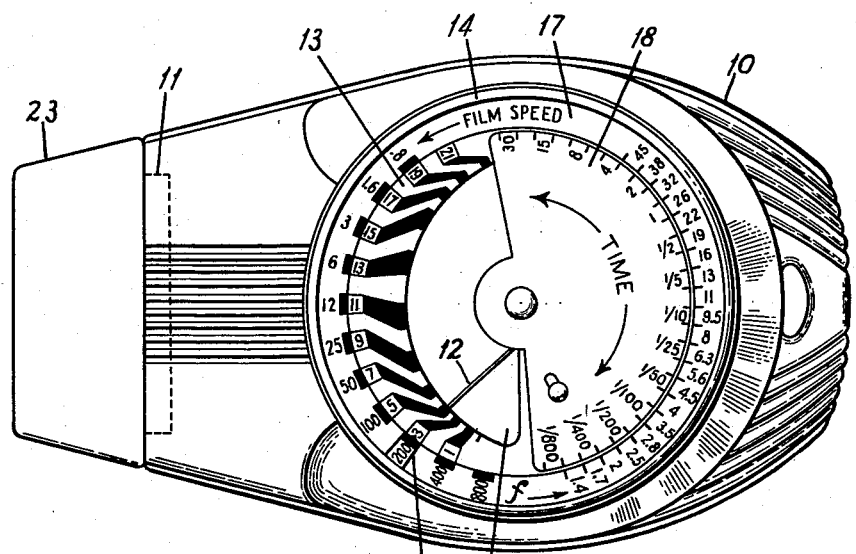
Figure 1 is a plan view of a meter made in accordance with one embodiment of this invention.
Figure 2 is a horizontal cross sectional view of the Figure 1 meter but showing only the mechanism for shifting one of the calculator members.
Figure 3:
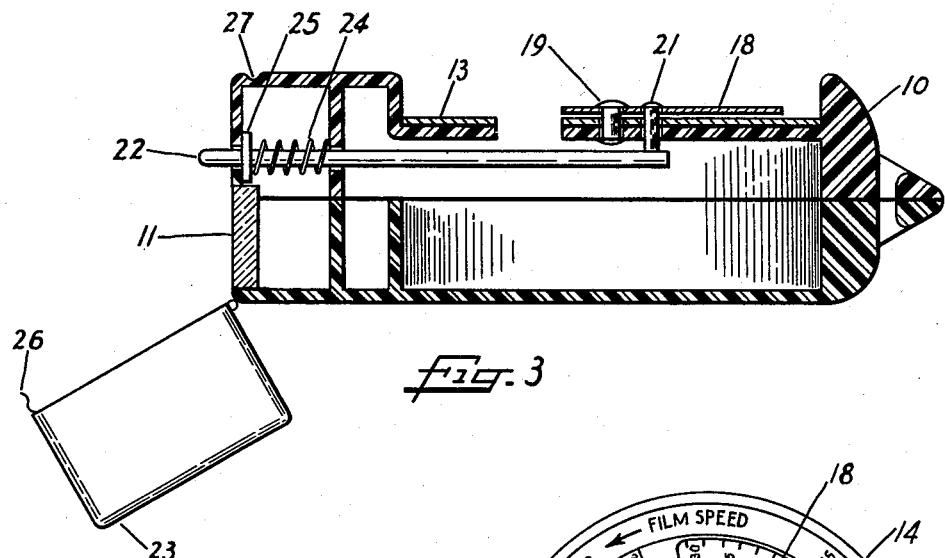
Figure 3 is a vertical, cross sectional view of the Figure 1 meter but showing only the shift mechanism with the baffle in inoperative position.

Referring now to Figures 1, 2 and 3, the case of the exposure meter is identified by the numeral 10 and is preferably molded of suitable plastic material. A photocell 11 is positioned at one end of the case 10 to be acted upon by the light rays coming from the scene being measured. The current generated by the photocell operates a sensitive, electrical instrument in a manner well known in the art and which is, therefore, not shown in the drawings. The electrical instrument is provided with a pointer 12 that cooperates with a scale 13 of light values and thus provides an indication of the relative intensity of light falling upon the surface of the photocell.

Rotatably secured to the case 10 is a narrow, metal rim 14 that carries a cover glass 15 having a reference index 16 thereon. The cover glass is frictionally retained within the rim so that the glass itself may be rotated within the rim for purposes more fully explained hereinbelow. Also positioned within the rim 14 is a ring shaped disc 17 carrying two sets of exposure factors thereon as for example, film speed values and "f" stop openings, substantially as shown. However, the disc 17 is fixedly secured to the rim 14. Thus, by grasping the rim in one hand and with the other hand applying an angular turning force against the glass, it is possible to set the reference index 16 over that number on the film speed scale of the disc 17 which corresponds to the speed of the particular film to be used in the taking of the picture.

The other requisite exposure factor, namely, shutter speeds of a camera, is carried by an independent plate 18 that is mounted for rotation about the rivet 19. An elongated slot 20 is cut in the plate 18 to accommodate the connecting pin 21 which is threaded into or otherwise secured to the plunger 22. Clearance slots (not shown) are also formed in the top of the case 10, and in the scale plate 13. It is apparent that linear motion of the plunger results in an angular rotation of the plate 18. As the plunger 22 is operated by the edge of the hinged hood or baffle 23 the normal position of the plunger is determined by the compression spring 24 and the stop washer 25 fixed on the plunger. To retain the baffle in operative position in front of the photocell a suitable latch may be provided as, for example, by the leaf spring 26 that seats into the recess 27 of the case.

Assuming that the scene to be photographed remains of constant light intensity it is apparent that the deflection of the instrument pointer will be greater when light rays from a relatively large angle of view are permitted to strike the photocell surface than when the view angle restricting baffle is placed over the photocell. Yet as the light intensity of the scene has not changed both conditions should result in the same camera setting of diaphragm opening and shutter speed. Thus, a multi-range exposure meter should likewise provide identical photographic information regardless of the optical characteristics of the baffle employed. I accomplish this result by providing a mechanism for automatically shifting the position of one of the calculator members in accordance with the view angle restricting character of the baffle employed to obtain a given light reading.

Figure 4:
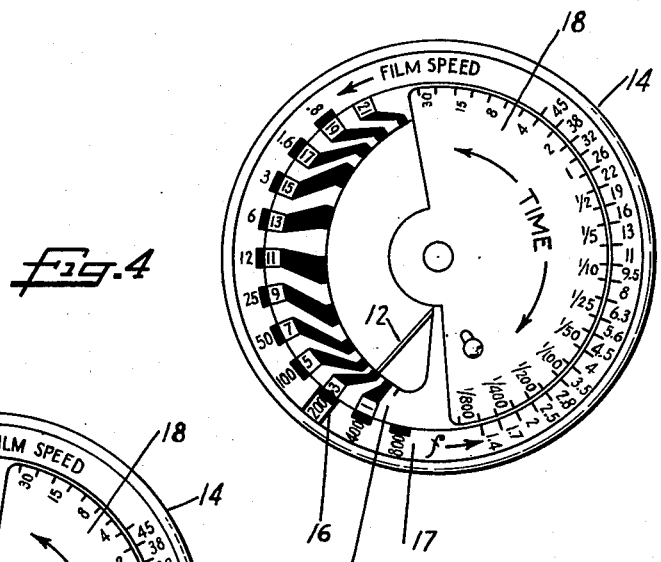
Figure 4 is a view of the calculator unit showing the exposure time dial position when the baffle is in the operative position.

Figure 4 illustrates the correlated settings of the calculator members when the baffle 23 (Figure 2) is in the operative position i. e., overlying the photocell. For purposes of illustration the speed of the film has been chosen as "200," as shown by the index 16 overlying the number "200" on the disc 17. The pointer indicates a light value of 3 hence the index 16 together with the film speed number "200" is aligned with this scale graduation. Under these conditions the various possible combinations of proper exposure factors, namely diaphragm opening and shutter speed are read from the thus correlated graduations of the time dial 18 and the "f" stop graduations on the disc 17. One such combination comprises a diaphragm opening of "f"-2.5 and a shutter speed of $\frac{1}{200}$ second.

Figure 5:
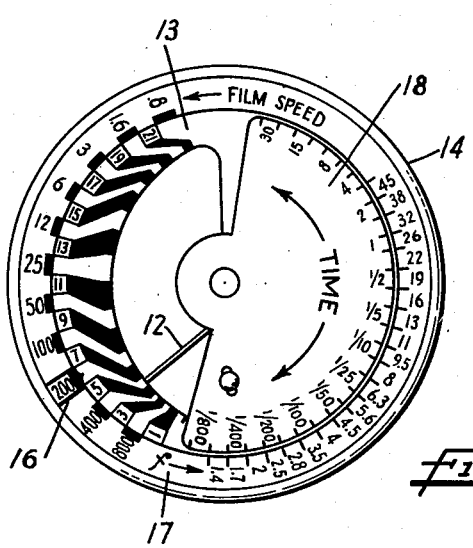
Figure 5 is a view similar to Figure 4 but showing the exposure time dial position when the baffle is in the inoperative position.

Now, assume that the baffle has been moved to the inoperative position (Figure 3). The plunger 22 has moved to the left under the action of the spring 24 causing a clockwise rotation of the plate 18 that carries the shutter speed value (see Figure 5). Removal of the baffle permits more light rays to strike the surface of the photocell and, consequently, the electrical instrument will indicate a higher light value on the scale. This condition is shown in Figure 5 in which the pointer 12 indicates a light value of 6. It is now only necessary for the user to manually rotate the rim 14 together with the disc 17 and glass top 15 as a unit in a clockwise direction to align the index 16 and the film speed value "200" with the new pointer indication, as shown. Reference to the shutter speed and diaphragm opening scales will disclose the same correlation between the exposure factors as with the baffle on, namely, a diaphragm opening of "f"-2.5 and a shutter speed of $\frac{1}{200}$ second.

It will now be apparent that movement of the light restricting baffle into and out of operative position causes a predetermined angular shift in the dial carrying one set of exposure factors. The extent of the shift is designed to compensate exactly for the change in the pointer position occasioned by the light restricting characteristics of the baffle.

Figure 6:
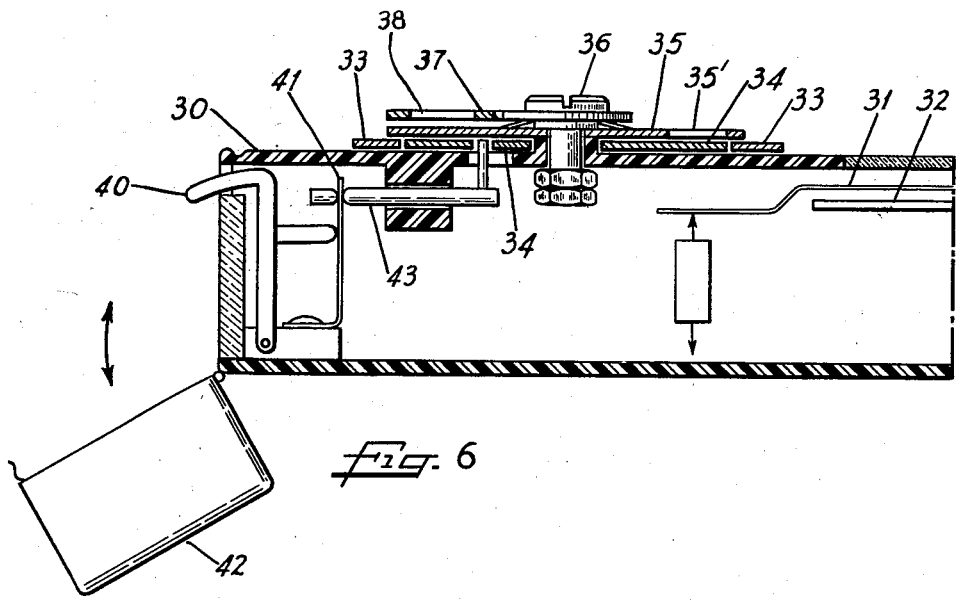
Figure 6 is a fragmentary cross-sectional view of the dial shifting mechanism applied to an exposure meter of the type wherein the calculator forms a separate unit apart from the light intensity instrument scale plate.
Figure 7:
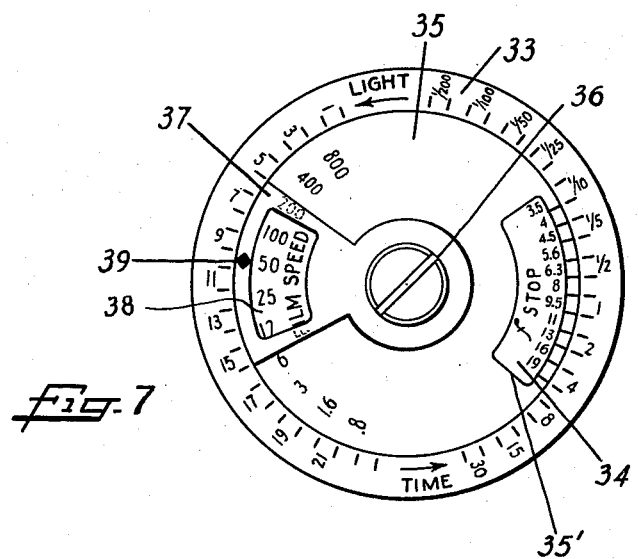
Figure 7 is a plan view of the assembled calculator unit employed on the meter shown in Figure 6.

Figures 6 and 7 illustrate the invention as applied to an exposure meter of the type wherein the calculator comprises a complete unit in itself and is not directly tied in with the photocell instrument scale plate. The case 30 houses an electrical instrument having a pointer 31 cooperating with a scale of light values carried by the plate 32. The calculator comprises a large dial 33 having an open center and carrying the exposure factors of light value and shutter speed, the light values corresponding to those marked on the instrument scale plate. Disposed within the large dial is another dial 34 marked with "f" stop values. Both dials 33 and 34 are movable relative to each other and to the meter case. Overlying the dials 33 and 34 is a third dial 35 having an arcuate opening 35' therein and carrying the film speed values. The dial 35 rests upon the shoulder of the case substantially as shown. A top dial 37 has the shape of a sector and includes an opening 38 and a fixed reference mark 39. The dials 35 and 37 are frictionally clamped together between the head of the stud 36 and the shoulder of the case but adapted to be moved relatively to one another so that the user may position the reference mark 39 adjacent to the desired film speed value. So long as one of the dials (35 or 37) is not restrained against movement the two dials rotate toegther as a unit in actual use. Having set the mark 39 to the proper film speed value a reading of the light value is obtained by aiming the exposure meter at the scene to be photographed and noting the pointer reading on the instrument scale plate. The light value corresponding to this reading is aligned with the mark 39 by manually rotating the dial 33 whereupon the correct combinations or correlation of "f" stop and shutter speed appear on the right hand side of the calculator.

The two positions of the innermost dial 34 corresponding to the "baffle on" and "baffle off" condition of use are controlled by the bell crank 40 operating against the action of the leaf spring 41 which is connected to the rod 43. With the baffle 42 in the inoperative position, as shown in Figure 6, the spring 41 is in its normal untensioned position. When the baffle is moved into position in front of the photocell the rocker arm 40 is mechanically rotated clockwise causing the rod 43 to rotate the dial 34 a predetermined angular extent through the medium of the intervening spring 41. Upon removing the baffle to the inoperative position the spring action causes the rocker arm, rod and the dial 34 to return to their respective, initial positions.

Having now described my invention in detail certain variations and modifications will be apparent to those skilled in the art. For example, the various exposure factors may be transposed on the various calculator dials provided only that the correct correlation of the various indicia is maintained. Also, the specific mechanism or mechanical linkage employed to displace one member of the calculator with respect to other members is subject to considerable latitude in design and arrangement of parts. The term hood and baffle are synonymous for purposes of this invention. It is apparent that the view angle of the photocell may be fixed by a separate baffle placed over the photocell or by recessing the photocell in the meter case in which instance the walls of the case serve the desired puropse. These and other variations may be made without departing from the spirit and scope of the invention as set forth in the following claims.

I claim:

1. An exposure meter of the type comprising an electrical instrument actuated by a photocell in response to the intensity of light striking said photocell, a baffle movable through manually controlled means into and out of operative position with respect to said photocell for controlling the view angle thereof, and a calculator device having one calculator member mechanically movable from one to the other of two predetermined positions and having thereon an appropriate scale of range of one exposure factor, and a second calculator member having thereon an appropriate scale of range of another exposure factor, said second calculator member being manually settable in conformity with the light intensity value indicated by said photocell electrical instrument and thereby to correlate the exposure factors on the two scales, and mechanical means associated with the mechanically movable calculator member and operative upon movement of the baffle from one to the other of its positions with respect to the photocell, to displace the said mechanically movable calculator member from one to the other of its predetermined positions, at which the said scales of exposure factors on said members will be thereby correlated to the change in view angle, when said manually settable member is reset to conform to the new light intensity value indicated by said photocell electrical instrument.

2. An exposure meter according to claim 1 wherein said mechanically movable calculator member and said manually settable calculator member are mounted for relative rotational movement.

3. An exposure meter according to claim 1 wherein the means operative to displace the mechanically movable calculator member from one to the other of its predetermined positions comprises a bar linked to said calculator member and normally biased in one direction by a spring.

4. In an exposure meter of the type comprising an electrical instrument actuated by a photocell in response to the intensity of light striking said photocell, a baffle manually movable into position for restricting the view angle of said photocell, and a calculator device comprising two relatively movable calculator members each bearing an appropriate scale of range of a different exposure factor, one of said relatively movable calculator members being manually settable in conformity with the light intensity value indicated by said photocell electrical instrument, and means automatically operative by said baffle for imparting to the other of said relatively movable calculator members a predetermined compensatory movement for adjusting the correlation of the exposure factors on the scales on said two calculator members to the change in view angle provided when the baffle is moved into view angle restricting position.

5. An exposure meter according to claim 4 wherein the two relatively movable calculator members are mounted for relative rotational movement about a common axis and the scale of range on one of the calculator members is sufficiently large to cooperate with the scale of range of the other calculator member to provide for correlating said scales after the compensatory movement imparted to one of the scales in response to the movement of the baffle.

MARLIN E. FOGLE.

(References on following page)

REFERENCES CITED

The following references are of record in the file of this patent:

UNITED STATES PATENTS

| Number | Name | Date |
|---|---|---|
| 2,045,797 | Presser | June 30, 1936 |
| 2,156,734 | McCune | May 2, 1939 |
| 2,178,197 | Bing | Oct. 31, 1939 |
| 2,213,642 | Tonnies | Sept. 3, 1940 |
| 2,247,805 | Faus | July 1, 1941 |
| 2,274,441 | Williams | Feb. 24, 1942 |
| 2,278,338 | Tonnies | Mar. 31, 1942 |
| 2,292,623 | Farrier | Aug. 11, 1942 |
| 2,389,617 | Freund | Nov. 27, 1945 |
| 2,437,774 | Wilcox | Mar. 16, 1948 |

FOREIGN PATENTS

| Number | Country | Date |
|---|---|---|
| 487,065 | Great Britain | June 15, 1938 |